(12) United States Patent
Osaki et al.

(10) Patent No.: US 11,695,754 B2
(45) Date of Patent: Jul. 4, 2023

(54) INFORMATION PROCESSING SYSTEM, INFORMATION PROCESSING METHOD, AND STORAGE MEDIUM

(71) Applicant: SHARP KABUSHIKI KAISHA, Sakai (JP)

(72) Inventors: Yosuke Osaki, Osaka (JP); Jin Gao, Osaka (JP); Keiko Hirukawa, Osaka (JP); Satoshi Terada, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 374 days.

(21) Appl. No.: 17/035,630

(22) Filed: Sep. 28, 2020

(65) Prior Publication Data

US 2021/0105262 A1 Apr. 8, 2021

(30) Foreign Application Priority Data

Oct. 2, 2019 (JP) .............................. JP2019-182235

(51) Int. Cl.
  *H04L 29/06* (2006.01)
  *H04L 9/40* (2022.01)
  *G06F 21/62* (2013.01)
  *G06F 16/182* (2019.01)

(52) U.S. Cl.
  CPC ........ *H04L 63/083* (2013.01); *G06F 16/1824* (2019.01); *G06F 21/6209* (2013.01)

(58) Field of Classification Search
  CPC . H04L 63/083; G06F 21/6209; G06F 16/1824
  See application file for complete search history.

(56) References Cited

U.S. PATENT DOCUMENTS

| | | | |
|---|---|---|---|
| 8,904,496 B1* | 12/2014 | Bailey | G06F 21/552 709/224 |
| 9,426,182 B1* | 8/2016 | Zeljko | H04L 63/08 |
| 2007/0286387 A1* | 12/2007 | Fuse | H04L 12/1831 379/202.01 |
| 2008/0253546 A1* | 10/2008 | Chen | H04M 3/565 379/202.01 |
| 2008/0307520 A1* | 12/2008 | Nelson | H04L 63/08 726/17 |
| 2011/0055227 A1* | 3/2011 | Igarashi | H04N 7/15 707/750 |
| 2011/0283345 A1* | 11/2011 | Kamei | G06Q 10/109 726/5 |
| 2013/0145284 A1* | 6/2013 | Anantharaman | H04M 3/567 715/753 |

(Continued)

FOREIGN PATENT DOCUMENTS

JP 2008-233970 A 10/2008
JP 5130126 B2 1/2013

*Primary Examiner* — Vance M Little
(74) *Attorney, Agent, or Firm* — ScienBiziP, P.C.

(57) ABSTRACT

An information processing system includes a file acquirer that acquires a file used in a meeting, an authentication processor that selects, if a password is set to the file acquired by the file acquirer, an authentication scheme of the password, based on meeting information about the meeting, and executes a process of authenticating the password by the selected authentication scheme, and a file executer that executes the file if the password is authenticated by the authentication processor.

6 Claims, 7 Drawing Sheets

(56) References Cited

U.S. PATENT DOCUMENTS

| | | | | |
|---|---|---|---|---|
| 2014/0337945 | A1* | 11/2014 | Jia | G06F 21/32 |
| | | | | 726/6 |
| 2014/0366098 | A1* | 12/2014 | Savage | H04L 67/62 |
| | | | | 709/205 |
| 2015/0046969 | A1* | 2/2015 | Abuelsaad | G06F 21/6218 |
| | | | | 726/1 |
| 2016/0050160 | A1* | 2/2016 | Li | H04L 65/4038 |
| | | | | 713/176 |
| 2016/0359838 | A1* | 12/2016 | Dasgupta | H04L 63/08 |
| 2019/0081968 | A1* | 3/2019 | Wang | H04L 63/102 |
| 2019/0303827 | A1* | 10/2019 | Hashimoto | G06Q 10/02 |

\* cited by examiner

| MEETING ID | MEETING NAME | MEETING ROOM ID | START DATE AND TIME | END DATE AND TIME | PARTICIPANT ID (USER ID) | FILE ID |
|---|---|---|---|---|---|---|
| M001 | M1 | R001 | 13:00 | 14:00 | U001,U002 | F001,F002 |
| M002 | M2 | R002 | 13:30 | 14:30 | U003,U004 | F003 |
| M003 | M3 | R003 | 15:00 | 16:00 | U005 | F004 |

FIG. 4

| FILE ID | IS PASSWORD SET? | PASSWORD |
|---|---|---|
| F001 | YES | abcd001 |
| F002 | NO | – |
| F003 | YES | efgh002 |
| F004 | NO | – |
| ... | ... | ... |

INFORMATION PROCESSING SYSTEM, INFORMATION PROCESSING METHOD, AND STORAGE MEDIUM

INCORPORATION BY REFERENCE

This application is based upon and claims the benefit of priority from the corresponding Japanese Patent Application No. 2019-182235 filed on Oct. 2, 2019, the entire contents of which are incorporated herein by reference.

BACKGROUND OF THE INVENTION

Field of the Invention

The present invention relates to an information processing system, an information processing method, and a storage medium.

Description of the Background Art

Conventionally, in a meeting in which a plurality of users (meeting participants) participate, a meeting system is utilized in which a material (file) for the meeting is displayed on a display installed in a meeting room and the plurality of users can view the material and write information into the material. In the meeting system, it is possible to share a display screen displayed on a user terminal with the display and another user terminal (Japanese Patent No. 5130126).

If a password is set to the file in the meeting, a user needs to operate an input device such as a software keyboard displayed on the display or a hardware keyboard mounted on the user terminal to enter the password during the meeting, which means that it is inconvenient to access the file. If an authentication scheme of the password employs a simple scheme to improve the convenience for accessing the file, there is a problem in that security deteriorates.

An object of the present invention is to provide an information processing system, an information processing method, and a storage medium, by which it is possible to improve convenience without deteriorating the security of a file used in a meeting.

SUMMARY OF THE INVENTION

An information processing system according to one aspect of the present invention includes a file acquirer that acquires a file used in a meeting, an authentication processor that selects, if a password is set to the file acquired by the file acquirer, an authentication scheme of the password, based on meeting information about the meeting, and executes a process of authenticating the password by the selected authentication scheme, and a file executer that executes the file if the password is authenticated by the authentication processor.

An information processing method according to another aspect of the present invention includes using one or more processors to execute acquiring a file used in a meeting, selecting, if a password is set to the file acquired in the acquiring, an authentication scheme of the password, based on meeting information about the meeting, and executing a process of authenticating the password by the selected authentication scheme, and executing the file if the password is authenticated in the selecting and executing.

In a non-transitory storage medium for storing an information processing program according to another aspect of the present invention, the information processing program causes one or more processors to execute acquiring a file used in a meeting, selecting, if a password is set to the file acquired in the acquiring, an authentication scheme of the password, based on meeting information about the meeting, and executing a process of authenticating the password by the selected authentication scheme, and executing the file if the password is authenticated in the selecting and executing.

According to the present invention, there are provided an information processing system, an information processing method, and a storage medium, by which it is possible to improve convenience without deteriorating the security of a file used in a meeting.

DESCRIPTION OF THE PREFERRED EMBODIMENTS

An embodiment of the present invention will be described below with reference to the attached drawings. The following embodiment is an example in which the present invention is embodied, and does not intend to limit the technical scope of the present invention.

An information processing system according to the present invention can be applied to, for example, a meeting in which one or more users participate at one place (a meeting room). A meeting system according to the present embodiment is an example of the information processing system according to the present invention. For example, the meeting system according to the present embodiment includes, in the meeting room, a user terminal utilized by each user participating in the meeting, and a display device, such as a display screen of the user terminal, that displays various types of information. The meeting system may further include, in the meeting room, a voice processing device (an AI speaker, a smart speaker, and the like) that transmits and receives a user's voice (a conversation, a voice command, and the like).

Meeting System 100

Figure 1:
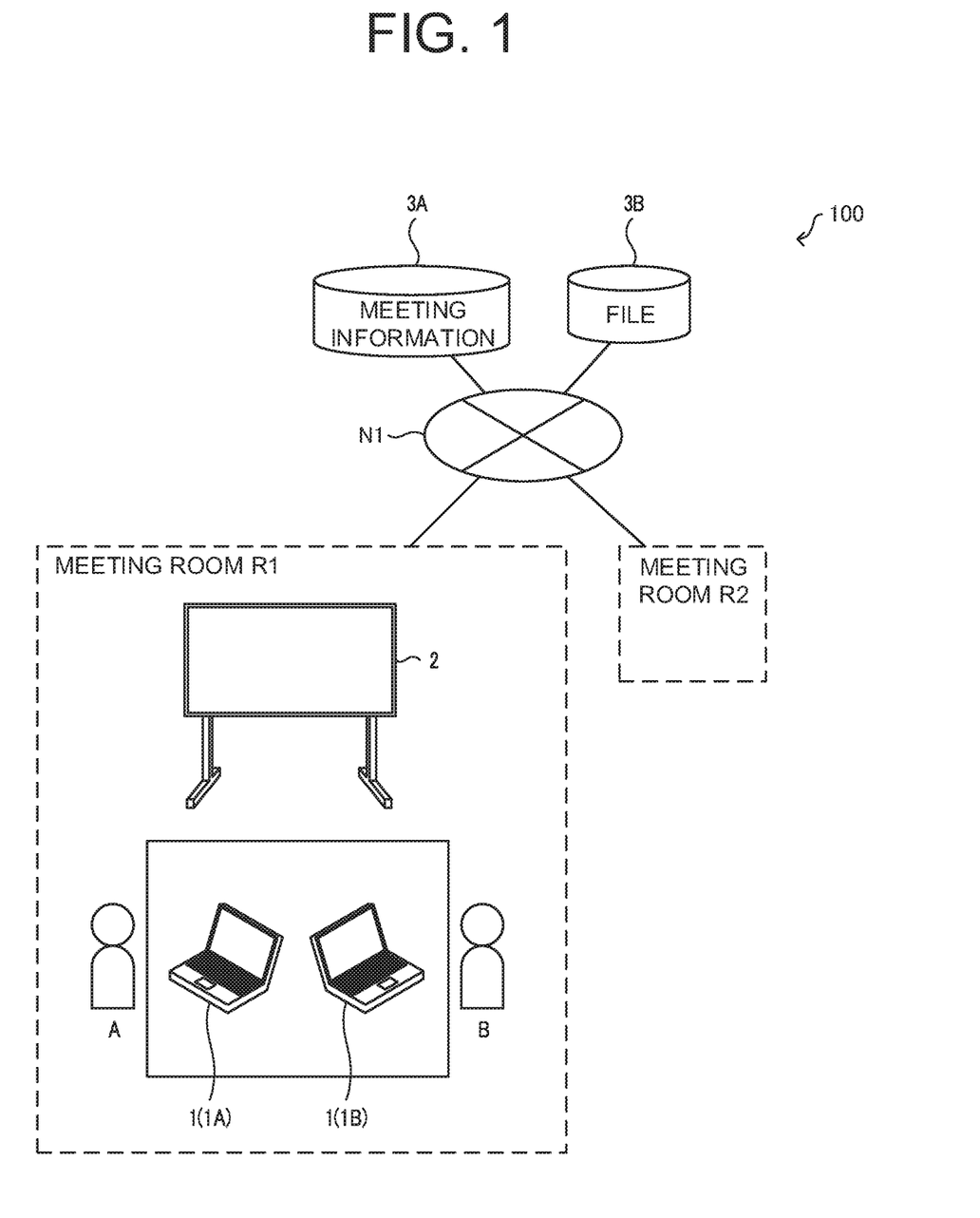
FIG. 1 is a schematic diagram illustrating a simplified configuration of a meeting system according to an embodiment of the present invention.

FIG. 1 is a diagram illustrating a simplified configuration of the meeting system according to the embodiment of the present invention. A meeting system 100 includes a user terminal 1, a display device 2, a meeting information database 3A, and a file database 3B. For example, as illustrated in FIG. 1, a user terminal 1A utilized by a user A being a participant of the meeting, a user terminal 1B utilized by a user B being a participant of the meeting, and the display device 2 are arranged in a meeting room R1.

Figure 3:
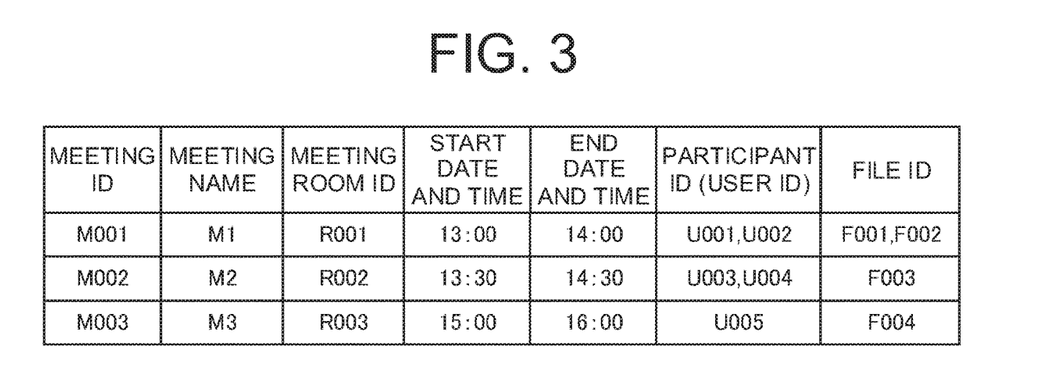
FIG. 3 is a table showing an example of meeting information utilized in the meeting system according to the embodiment of the present invention.

In the meeting information database 3A, meeting information about the meeting is registered. FIG. 3 shows an example of the meeting information database 3A. In the meeting information database 3A, information (schedule information) including a "meeting ID", a "meeting name", a "meeting room ID", a "start date and time", an "end date and time", a "participant ID", and a "file ID" corresponding to each meeting is registered in a mutually associated manner. The "meeting ID" is identification information of the meeting, and the "meeting name" is the name (subject name) of the meeting. The "start date and time" is the date and time of the start of the meeting, and the "end date and time" is the date and time of the end of the meeting. The "start date and time" and the "end date and time" correspond to the date and time during which the meeting is held. The "participant ID" is identification information (a user ID) of a user participating in the meeting. The "file ID" is identification information of a file (material) used in the meeting, and file data corresponding to the file ID is stored in the file database 3B. The meeting information database 3A is registered in advance by a person in charge or the like when the schedule of the meeting is decided. FIG. 3 shows that the user A ("U001") and the user B ("U002") are registered as participants of a meeting M1 held in the meeting room R1 ("R001"), a user C ("U003") and a user D ("U004") are registered as participants of a meeting M2 held in a meeting room R2 ("R002"), and a user E ("U005") is registered as a participant of a meeting M3 held in a meeting room R3 ("R003"). FIG. 3 shows that a file ID "F001" and a file ID "F002" are registered as files used in the meeting M1, a file ID "F003" is registered as a file used in the meeting M2, and a file ID "F004" is registered as a file used in the meeting M3.

Figure 4:
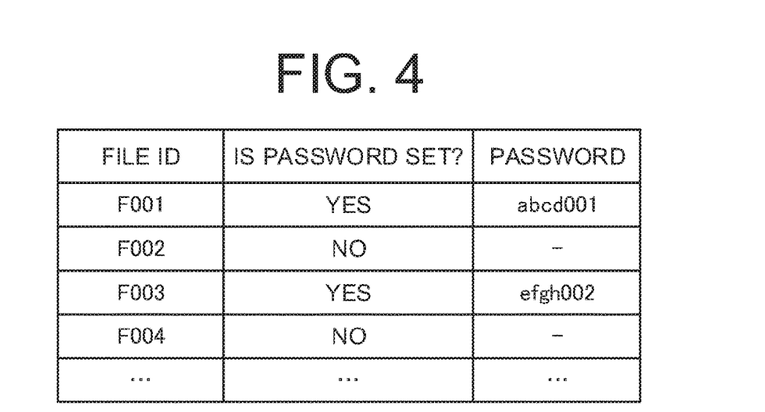
FIG. 4 is a table showing an example of file information utilized in the meeting system according to the embodiment of the present invention.

File information about the file and the file data are registered in the file database 3B. FIG. 4 shows an example of the file information. In the file information, information including the "file ID", "Is password set?", and a "password" corresponding to each file is registered in a mutually associated manner. The "Is password set?" is information for identifying whether a password is set to a file (presence or absence of a password). The "password" is information of a password set to a file. When a user executes (opens) a file, the file is executed if a password input by the user matches the password registered in the file information. The password is set in advance by a file administrator.

User Terminal 1

Figure 2:
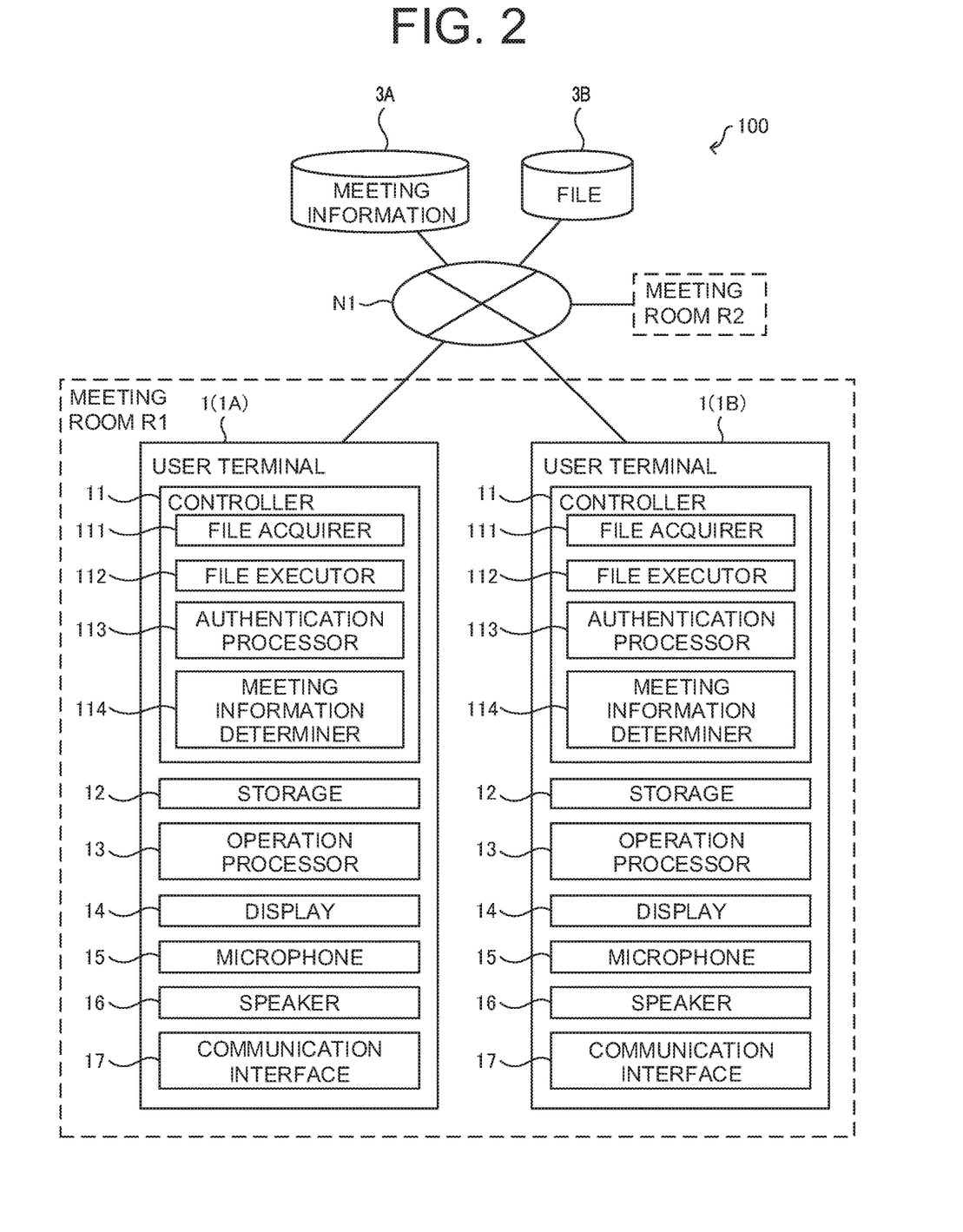
FIG. 2 is a functional block diagram illustrating a configuration of the meeting system according to the embodiment of the present invention.

As illustrated in FIG. 2, the user terminal 1 includes a controller 11, a storage 12, an operation processor 13, a display 14, a microphone 15, a speaker 16, a communication interface 17, and the like. FIG. 2 illustrates the user terminal 1A and the user terminal 1B arranged in the meeting room R1. The user terminals 1A and 1B have the same function.

The operation processor 13 is a mouse, a keyboard, a touch panel, or the like that receives an operation of a user utilizing the user terminal 1. The display 14 is a display panel such as a liquid crystal display or an organic EL display that displays various types of information. The operation processor 13 and the display 14 may be an integrally formed user interface.

The microphone 15 collects a voice of the user of the user terminal 1. Data of the voice (voice data) collected by the microphone 15 is input to the controller 11. The speaker 16 outputs a sound based on a command from the controller 11.

The communication interface 17 connects the user terminal 1 to a network N1 by wire or wirelessly, and is a communication interface for performing data communication complying with a predetermined communication protocol, with other devices (for example, the user terminal 1, the display device 2, the meeting information database 3A, and the file database 3B) via the network N1.

The storage 12 is a non-volatile storage including a flash memory, a hard disk drive (HDD), or a solid state drive (SSD) that stores various types of information. The storage 12 stores a control program such as a file control program for causing the controller 11 to execute a file control process (see FIG. 5) described later. For example, the file control program may be recorded non-temporarily in a computer-readable recording medium such as a USB, a CD, or a DVD, read by a reading device (not illustrated) such as a USB, a CD drive, or a DVD drive provided in the user terminal 1, and stored in the storage 12. The file control program may be downloaded from a cloud server (not illustrated) and stored in the storage 12.

The controller 11 includes a control device such as a CPU, a ROM, and a RAM. The CPU is a processor for executing various types of arithmetic processes. The ROM stores in advance a control program such as BIOS and OS for causing the CPU to execute various types of processes. The RAM stores various types of information and is used as a temporary storage memory (working area) for various types of processes executed by the CPU. The controller 11 controls the user terminal 1 by causing the CPU to execute various types of control programs stored in advance in the ROM or the storage 12.

Specifically, the controller 11 includes various types of processing operators such as a file acquirer 111, a file executer 112, an authentication processor 113, and a meeting information determiner 114. The controller 11 functions as the various types of processing operators by causing the CPU to execute various types of processes according to the control programs. Some or all of the processing operators included in the controller 11 may include an electronic circuit. The control programs may be programs for causing a plurality of processors to function as the various types of processing operators.

The file acquirer 111 acquires a file used in the meeting. The file acquirer 111 is an example of a file acquirer according to the present invention. Specifically, if the user selects a file stored in the file database 3B on the user terminal 1, the file acquirer 111 acquires the file from the file database 3B.

For example, the user A participating in the meeting launches a predetermined meeting application on the user terminal 1A and performs a login operation. If the meeting application authenticates the user A, the meeting application causes the user terminal 1A to display a file selection screen. If the user A selects a desired file on the file selection screen, the file acquirer 111 of the user terminal 1A acquires the file from the file database 3B. Login information (a user ID, a password, and the like) for logging in to the meeting application may be set.

For example, a user not participating in the meeting accesses the file database 3B in the user terminal 1 of the user to select a desired file. Thereby, the file acquirer 111 of the user terminal 1 acquires the file from the file database 3B. Access information (a user ID, a password, and the like) for accessing the file database 3B may be set.

The file acquirer 111 stores the file acquired from the file database 3B into the storage 12.

The file executer 112 executes the file acquired by the file acquirer 111. Specifically, the file executer 112 launches a predetermined application to execute a process of opening the file. The file executer 112 refers to the file information (see FIG. 4) of the file database 3B to determine whether a password is set to the file.

If a password is not set to the file (for example, the file ID "F002" in FIG. 4), the file executer 112 uses the application to open the file and causes the display 14 to display the file information (material). On the other hand, if a password is set to the file (for example, the file ID "F001" in FIG. 4), the later-described authentication processor 113 executes an authentication process, and on the condition that the password is authenticated, the file executer 112 uses the application to open the file and causes the display 14 to display the file information (material). The file executer 112 may cause the display device 2 to display the file information. The file executer 112 is an example of a file executer according to the present invention.

If a password is set to the file acquired by the file acquirer 111, the authentication processor 113 selects an authentication scheme of the password, based on the meeting information (see FIG. 3) of the meeting information database 3A, and executes a process of authenticating the password by the selected authentication scheme. The authentication scheme of the password includes a first authentication scheme that executes a process of authenticating the password, based on a character input by the user, and a second authentication scheme that is different from the first authentication scheme. The second authentication scheme is, for example, a scheme of determining whether a voice input by the user matches the password. That is, the authentication processor 113 selects the first authentication scheme or the second authentication scheme, based on at least any one piece of information included in the meeting information.

The meeting information determiner 114 refers to the meeting information (see FIG. 3) to determine whether a current time is included in a time range for the date and time during which the meeting is held, for example. If the current time is not included in the time range for the date and time during which the meeting is held, the authentication processor 113 selects the first authentication scheme. In this case, the authentication processor 113 causes the user terminal 1 or the display device 2 to display an input screen for inputting a character of the password, and receives a character of the password input by the user. The user operates an input device (such as a keyboard) of the user terminal 1 or the display device 2 to input a character corresponding to the password. Upon acquiring the input character, the authentication processor 113 refers to the file information (see FIG. 4) of the file database 3B to collate the input character input by the user with the password in the file information. If the input character and the password match, the authentication processor 113 authenticates the password. As a result, the file executer 112 unlocks the password of the file and causes the display 14 to display the file information (material).

On the other hand, if the current time is included in the time range for the date and time during which the meeting is held, the authentication processor 113 selects the second authentication scheme. In this case, for example, the authentication processor 113 operates the microphone 15 of the user terminal 1 to receive a voice input of a password from the user. The authentication processor 113 may cause the user terminal 1 to display a message prompting the user to enter the password by voice. The display device 2 or the voice processing device (not illustrated) may have a microphone function for acquiring a voice of the user. For example, the user utters a voice corresponding to the password toward the microphone 15 of the user terminal 1. Upon acquiring the input voice data, the authentication processor 113 executes a voice recognition process to convert the voice data into a character string, and refers to the file information (see FIG. 4) of the file database 3B to collate the input voice (converted character string) input by the user with the password of the file information. If the input voice and the password match, the authentication processor 113 authenticates the password. As a result, the file executer 112 unlocks the password of the file and causes the display 14 to display the file information (material).

The second authentication scheme is not limited to the above-described scheme. For example, the second authentication scheme may be a scheme of determining whether a voiceprint of the voice input by the user matches a voiceprint of the participant registered in advance. In this case, voiceprint information of the participant is registered in advance in the meeting information database 3A or the user information database (not illustrated). The authentication processor 113 authenticates the password of the file if a voiceprint of a user's voice acquired via the microphone 15 matches the voiceprint of the participant.

As described above, if the current time is not included in the time range for the date and time during which the meeting is held, the authentication processor 113 executes the process of authenticating the password by the first authentication scheme using a character input operation. On the other hand, if the current time is included in the time range for the date and time during which the meeting is held, the authentication processor 113 executes the process of authenticating the password by the simple second authentication scheme without using a character input operation. Thus, the user does not experience a trouble of operating a keyboard or the like to input the password during the meeting. Therefore, it is possible to improve the convenience without deteriorating the security of the file used in the meeting.

Here, the authentication processor 113 selects (switches) the first authentication scheme and the second authentication scheme, based on at least any one piece of information included in the meeting information (see FIG. 3). The meeting information includes at least any one piece of information among a date and time during which the meeting is held, a participant of the meeting, a place where the meeting is held, and a device utilized in the meeting.

For example, the authentication processor 113 may select the first authentication scheme if a user who accesses the file is not a participant of the meeting, and may select the second authentication scheme if a user who accesses the file is a participant of the meeting. The identification information of a user who accesses the file is identified, for example, from login information (a user ID) of the meeting application, access information (a user ID) for accessing the file database 3B, and the like.

For example, the authentication processor 113 may select the first authentication scheme if a position of a user who accesses the file is not included in a place where the meeting is held, and may select the second authentication scheme if a position of a user who accesses the file is included in a place where the meeting is held. A position (current position) of a user who accesses the file is identified by utilizing, for example, a communication function installed in the user terminal 1, a beacon installed in the meeting room, a near-field wireless communication device, or the like.

For example, the authentication processor 113 may select the first authentication scheme if the user terminal 1 of a user who accesses the file is not registered in the meeting information, and may select the second authentication scheme if the user terminal 1 of a user who accesses the file is registered in the meeting information. In this case, identification information of the user terminal 1 used by a user participating in the meeting is registered in advance in the meeting information (see FIG. 3). The identification information of the user terminal 1 is identified if the user terminal 1 is connected to the network N1.

For example, the authentication processor 113 may combine a plurality of pieces of information included in the meeting information to select the first authentication scheme or the second authentication scheme. For example, the authentication processor 113 may select the first authentication scheme if a user who accesses the file is not a participant of the meeting or if a position of a user is not included in a place where the meeting is held, and may select the second authentication scheme if a user who accesses the file is a participant of the meeting and a position of a user is included in a place where the meeting is held.

Thus, the authentication processor 113 executes the process of authenticating the password of the file by the first authentication scheme if determining that a user who accesses the file does not participate in the meeting, and executes the process of authenticating the password of the file by the second authentication scheme if determining that a user who accesses the file participates in the meeting.

Some or all of the pieces of information such as the meeting information (see FIG. 3) of the meeting information database 3A and the file information (see FIG. 4) of the file database 3B may be stored in any one of the user terminal 1 or the display device 2 or may be stored in the plurality of devices in a dispersed manner. Each of the pieces of information may be stored in a server accessible from the meeting system 100. In this case, the meeting system 100 may acquire each of the pieces of information from the server and execute each process such as the file control process (see FIG. 5) or the like described below.

File Control Process

Below, an example of a procedure of the file control process executed in the meeting system 100 will be described with reference to FIG. 5.

The present invention can be regarded as an invention of a file control method (an example of an information processing method of the present invention) in which one or more steps included in the file control process are executed. One or more steps included in the file control process described here may be omitted where appropriate. The steps in the file control process may be executed in a different order as long as a similar operation and effect are achieved. Although a case where each of the steps in the file control process is executed by the controller 11 of the user terminal 1 included in the meeting system 100 will be described as an example here, in another embodiment, each of the steps in the file control process may be executed by one or more processors in a dispersed manner.

For example, the file control process is individually executed in parallel in each of the user terminals 1.

First, in step S1, the controller 11 acquires a file (target file) selected by a user. Specifically, if a user selects a desired file in the user terminal 1, the controller 11 acquires a file from the file database 3B.

Next, in step S2, the controller 11 launches a predetermined application to execute a process of opening the target file. Step S1 is an example of acquiring a file according to the present invention.

Next, in step S3, the controller 11 determines whether a password is set to the target file. Specifically, the controller 11 refers to the file information (see FIG. 4) of the file database 3B to determine whether a password is set to the target file. If a password is set to the target file (S3: Yes), the processing proceeds to step S4, and if a password is not set to the target file (S3: No), the processing proceeds to step S9.

In step S4, the controller 11 acquires the meeting information. Specifically, the controller 11 acquires the meeting information (see FIG. 3) registered in the meeting information database 3A.

Next, in step S5, the controller 11 determines whether a current time is included in a time range for the date and time during which the meeting is held. Specifically, the controller 11 refers to the meeting information (see FIG. 3) to determine whether the current time is included in the time range for the date and time during which the meeting is held. If the current time is included in the time range for the date and time during which the meeting is held (S5: Yes), the processing proceeds to a meeting authentication process of step S6, and if the current time is not included in the time range for the date and time during which the meeting is held (S5: No), the processing proceeds to a standard authentication process of step S7.

In the meeting authentication process of step S6, first, in step S61, the controller 11 receives a voice of a password input by the user. The controller 11 causes the user terminal 1 to display a message prompting the user to enter the password by voice.

Next, in step S62, if the user utters a voice corresponding to the password toward the microphone 15 of the user terminal 1, the controller 11 acquires the input voice data.

Next, in step S63, the controller 11 executes a voice recognition process to convert the voice data into a character string, and refers to the file information (see FIG. 4) of the file database 3B to collate the input voice (converted character string) input by the user with the password of the file information. Then, the processing proceeds to step S8. Step S6 is an example of selecting an authentication scheme and executing a process of authenticating the password according to the present invention.

On the other hand, in the standard authentication process of step S7, first, in step S71, the controller 11 receives a character of the password input by the user. The controller 11 causes the user terminal 1 to display an input screen for inputting a character of the password.

Next, in step S72, if the user operates the input device (keyboard or the like) of the user terminal 1 to input a character corresponding to the password, the controller 11 acquires the input character.

Next, in step S73, upon acquisition of the input character, the controller 11 refers to the file information (see FIG. 4) of the file database 3B to collate the character input by the user with the password of the file information. Then, the processing proceeds to step S8. Step S7 is an example of selecting an authentication scheme and executing a process of authenticating the password according to the present invention.

In step S8, the controller 11 determines whether the input voice or the input character matches the password. If the input voice or the input character matches the password (S8: Yes), the password is unlocked and the processing proceeds to step S9. If the input voice or the input character does not match the password (S8: No), the password is rejected and the processing returns to step S5. Step S9 is an example of executing a file according to the present invention.

In step S9, the controller 11 causes the display 14 to display file information (a material) of the target file. The controller 11 may cause the display device 2 to display the file information (material). The controller 11 may share the file information (material) with another user terminal 1 to display the file information in the other user terminal 1. As described above, the controller 11 executes the file control process.

Figure 5:
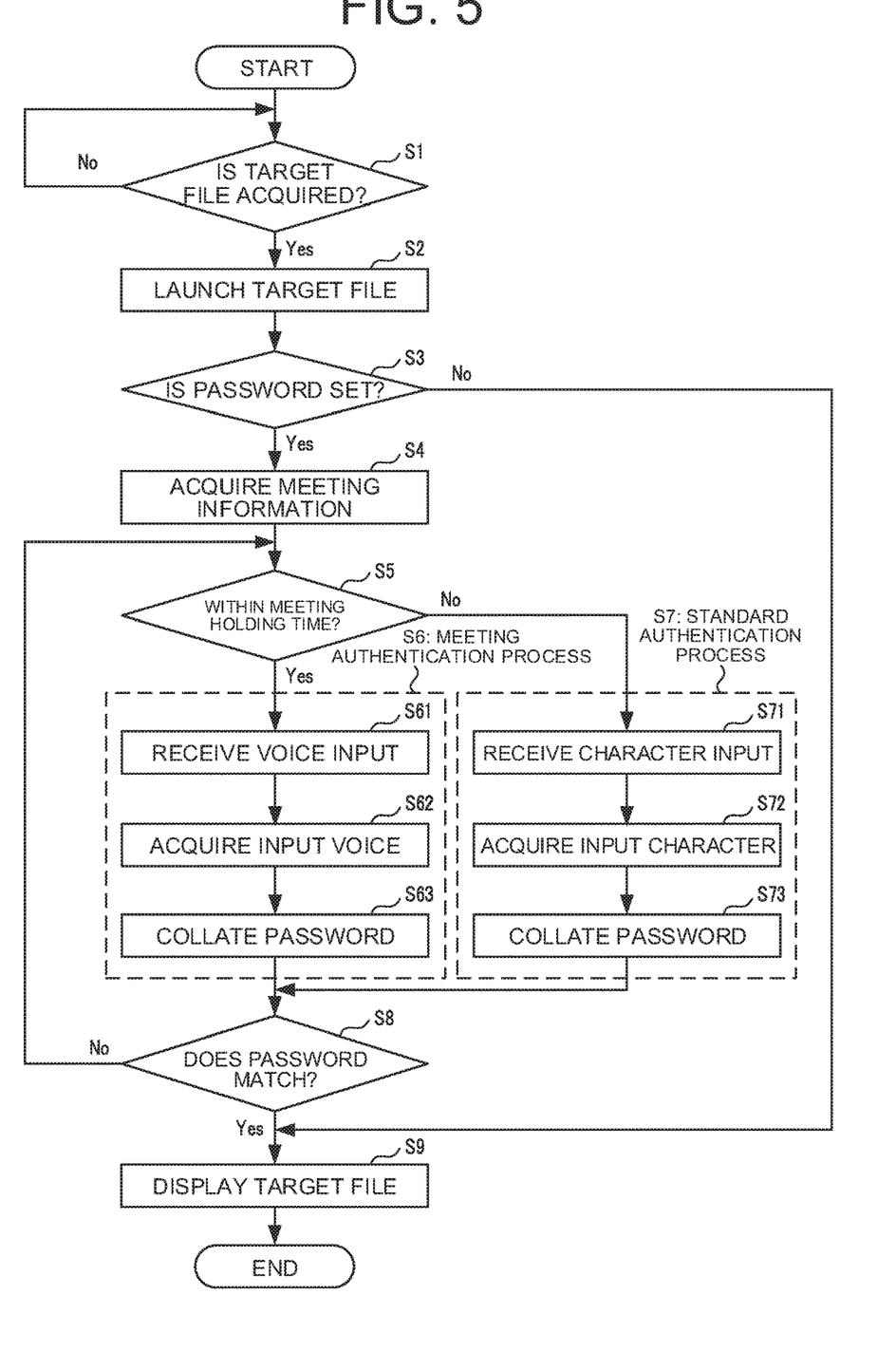
FIG. 5 is a flowchart for describing an example of a procedure of a file control process executed in the meeting system according to the embodiment of the present invention.

In the example illustrated in FIG. 5, the process of determining whether the current time is included in the date and time during which the meeting is held is executed in step S5, but the determination process in step S5 is not limited thereto. As described above, the controller 11 may use at least any one piece of information among a date and time during which the meeting is held, participants of the meeting, a place where the meeting is held, and a device utilized in the meeting to execute the determination process. Other examples of the determination process are illustrated in FIGS. 6 and 7.

Figure 6:
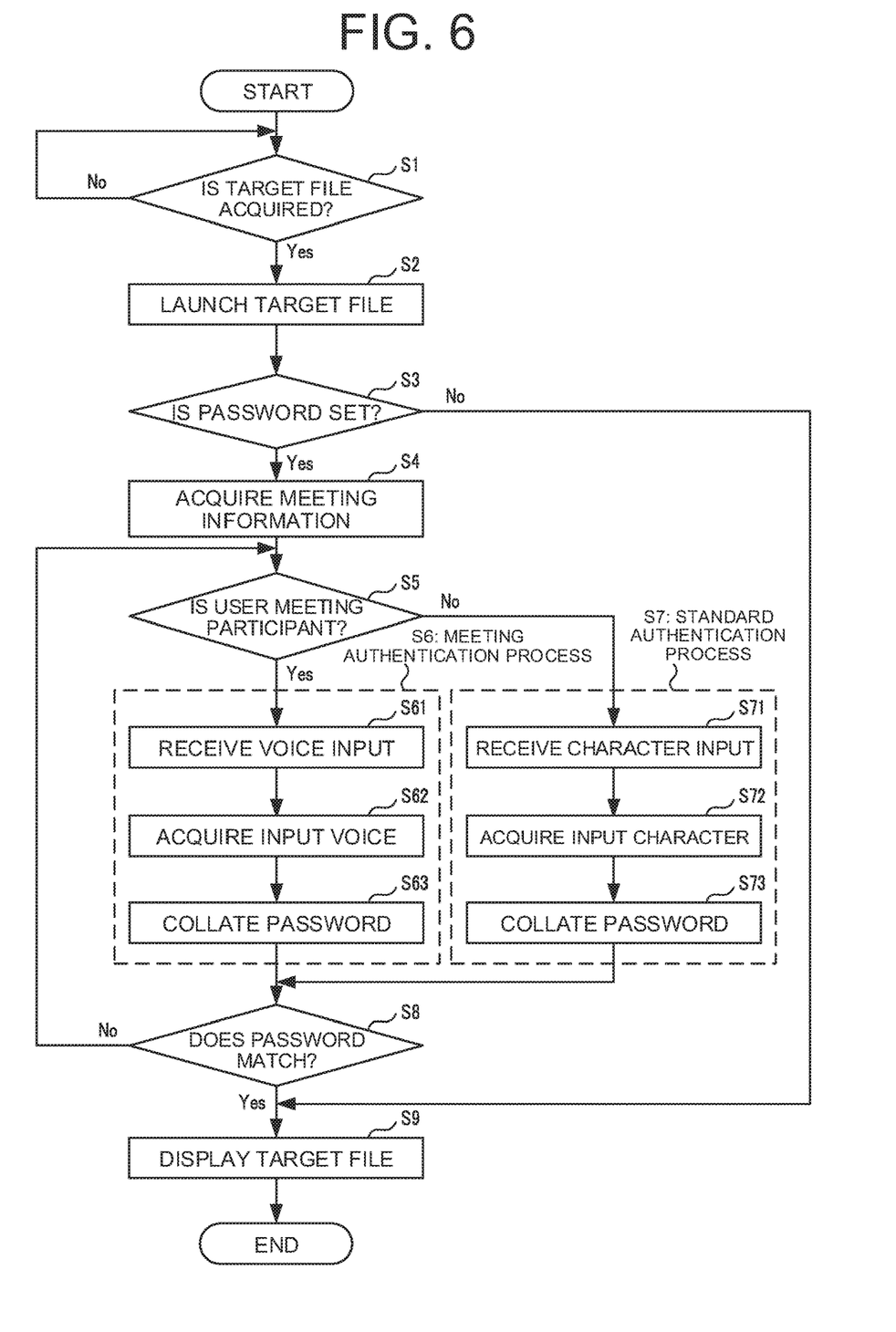
FIG. 6 is a flowchart for describing an example of a procedure of a file control process executed in the meeting system according to the embodiment of the present invention.

In the example illustrated in FIG. 6, in step S5, the controller 11 executes a process of determining whether a user who accesses the target file is a participant of the meeting. If the user who accesses the target file is a participant of the meeting (S5: Yes), the processing proceeds to the meeting authentication process of step S6, and if the user who accesses the target file is not a participant of the meeting (S5: No), the processing proceeds to the standard authentication process of step S7.

Figure 7:
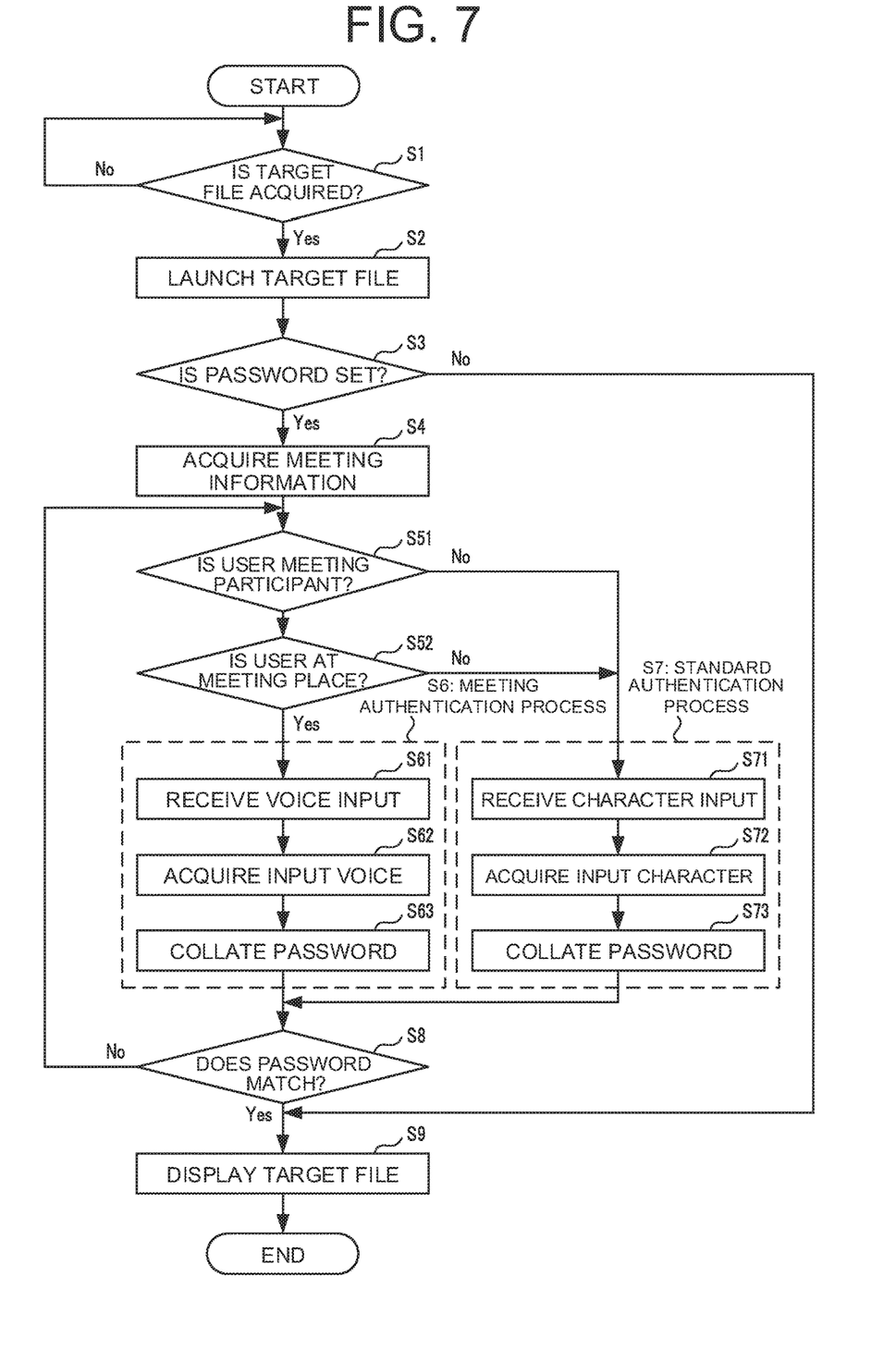
FIG. 7 is a flowchart for describing an example of a procedure of a file control process executed in the meeting system according to the embodiment of the present invention.

In the example illustrated in FIG. 7, in step S51, the controller 11 executes a process of determining whether the user who accesses the target file is a participant of the meeting. In step S52, the controller 11 executes a process of determining whether a position of the user who accesses the target file is included in the place where the meeting is held. If the user who accesses the target file is a participant of the meeting (S51: Yes) and the position of the user is included in the place where the meeting is held (S52: Yes), the processing proceeds to the meeting authentication process of step S6. On the other hand, if the user who accesses the target file is not a participant of the meeting (S51: No) or if the position of the user is not included in the place where the meeting is held (S52: No), the processing proceeds to the standard authentication process of step S7.

In the example illustrated in FIG. 5, in the meeting authentication process of step S6, the controller 11 collates the password input by the voice of the user, but the collation process of step S6 is not limited thereto. As described above, the controller 11 may collate the password, based on a voiceprint of the user. The controller 11 may collate the password, based on biometric information (a fingerprint, veins, a face) of the user.

The controller 11 may collate the password by reading an information code (a one-dimensional code, a two-dimensional code, and the like) presented by the user. In this case, for example, the user places a two-dimensional code displayed on a mobile terminal (such as a smartphone) over a reader (not illustrated) of the user terminal 1, and the controller 11 of the user terminal 1 collates the password, based on information read from the two-dimensional code. The controller 11 may read an ID card held by the user to collate the password.

The meeting system according to the present invention is not limited to the above-described embodiment. For example, the meeting system according to the present invention may further include a management server 4 connected to the network N1. The management server 4 may include, for example, at least any one of the processing operators (the file acquirer 111, the file executer 112, the authentication processor 113, and the meeting information determiner 114) included in the user terminal 1.

Figure 8:
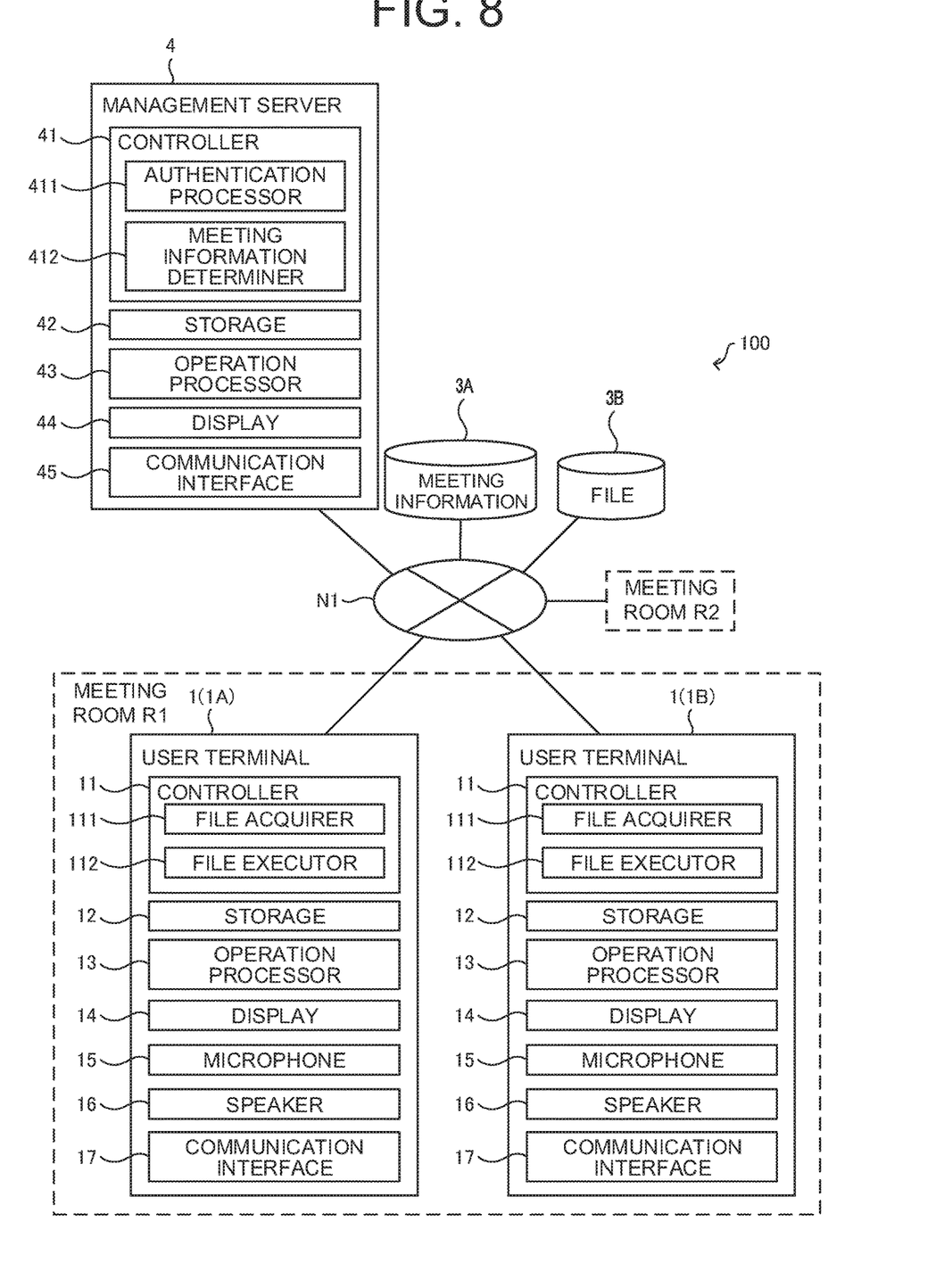
FIG. 8 is a functional block diagram illustrating another configuration of the meeting system according to the embodiment of the present invention.

For example, as illustrated in FIG. 8, a controller 41 of the management server 4 includes an authentication processor 411 having the same function as the authentication processor 113 of the user terminal 1 and a meeting information determiner 412 having the same function as the meeting information determiner 114 of the user terminal 1. The management server 4 includes a storage 42, an operation processor 43, a display 44, a communication interface 45, and the like. The storage 42 may store the meeting information of the meeting information database 3A, the file information of the file database 3B, and the like. The storage 42 stores the file control program.

For example, if a password is set to the file selected by the user, the authentication processor 411 selects an authentication scheme of the password, based on the meeting information (see FIG. 3) and executes a process of authenticating the password by the selected authentication scheme. If the password is authenticated, the authentication processor 411 transmits authentication information to the user terminal 1. Upon acquisition of the authentication information, the file executer 112 of the user terminal 1 unlocks the password of the file and opens the file.

Thus, the management server 4 may manage the access to each file by executing the process of authenticating the password set to each file.

In the embodiment described above, the meeting system 100 corresponds to the information processing system according to the present invention, but the information processing system according to the present invention is not limited thereto. For example, the information processing system according to the present invention may be configured by the user terminal 1 alone, may be configured by the management server 4 alone, or may be configured by the user terminal 1 and the management server 4. The information processing system according to the present invention may be configured by at least any one of the user terminal 1, the display device 2, and the management server 4.

It is noted that, in the information processing system according to the present invention, within the scope of the invention described in claims, the embodiments described above may be freely combined, or the embodiments may be appropriately modified or some of the embodiments may be omitted.

What is claimed is:

1. An information processing system, comprising:
   a file acquirer that acquires a file used in a meeting;
   an authentication processor that selects, when a password is set to the file acquired by the file acquirer, an authentication scheme associated with the password based on meeting information about the meeting, and executes a process of authenticating the password using the selected authentication scheme; and
   a file executer that executes the file when the password is authenticated by the authentication processor, wherein:
   in the meeting information, identification information of the meeting and identification information of at least one user terminal used by a user participating in the meeting are registered in advance in association with each other, and
   when identification information of a first user terminal of a first user who accesses the file is not registered in the meeting information, the authentication processor selects a first authentication scheme for executing the process of authenticating the password based on at least one character input by the first user using the first user terminal, and when identification information of a second user terminal of a second user who accesses the file is registered in the meeting information, the authentication processor selects a second authentication scheme for executing the process of authenticating the password, the second authentication scheme being different from the first authentication scheme.

2. The information processing system according to claim 1, wherein the meeting information includes one or more of a date and time during which the meeting is held, a participant of the meeting, a place where the meeting is held, and a device utilized in the meeting.

3. The information processing system according to claim 1, wherein the second authentication scheme is a scheme of determining whether a voice input by the second user matches the password, or a scheme of determining whether a voiceprint of the voice input by the second user matches a voiceprint of the participant registered in advance.

4. The information processing system according to claim 1, wherein:
the authentication processor acquires identification information of the first user terminal when the first user terminal is connected to a network, and determines whether the identification information of the first user terminal is registered in the meeting information, and
the authentication processor acquires identification information of the second user terminal when the second user terminal is connected to the network, and determines whether the identification information of the second user terminal is registered in the meeting information.

5. An information processing method comprising using one or more processors to execute one or more instructions for:
acquiring a file used in a meeting;
selecting, when a password is set to the file, an authentication scheme associated with the password based on meeting information about the meeting, and executing a process of authenticating the password using the selected authentication scheme; and
executing the file when the password is authenticated, wherein:
in the meeting information, identification information of the meeting and identification information of at least one user terminal used by a user participating in the meeting are registered in advance in association with each other, and
when identification information of a first user terminal of a first user who accesses the file is not registered in the meeting information, the authentication processor selects a first authentication scheme for executing the process of authenticating the password based on at least one character input by the first user using the first user terminal, and when identification information of a second user terminal of a second user who accesses the file is registered in the meeting information, the authentication processor selects a second authentication scheme for executing the process of authenticating the password, the second authentication scheme being different from the first authentication scheme.

6. A non-transitory storage medium for storing an information processing program executable by one or more processors to:
acquire a file used in a meeting;
select, when a password is set to the file, an authentication scheme associated with the password based on meeting information about the meeting, and execute a process of authenticating the password using the selected authentication scheme; and
execute the file if the password is authenticated, wherein:
in the meeting information, identification information of the meeting and identification information of at least one user terminal used by a user participating in the meeting are registered in advance in association with each other, and
when identification information of a first user terminal of a first user who accesses the file is not registered in the meeting information, the authentication processor selects a first authentication scheme for executing the process of authenticating the password based on at least one character input by the first user using the first user terminal, and when identification information of a second user terminal of a second user who accesses the file is registered in the meeting information, the authentication processor selects a second authentication scheme for executing the process of authenticating the password, the second authentication scheme being different from the first authentication scheme.

* * * * *